(12) United States Patent
Chung et al.

(10) Patent No.: US 10,960,847 B2
(45) Date of Patent: Mar. 30, 2021

(54) IN-VEHICLE CONTROL APPARATUS USING SMART KEY PROVIDED WITH DISPLAY AND METHOD FOR CONTROLLING THE SAME

(71) Applicants: Hyundai Motor Company, Seoul (KR); Kia Motors Corporation, Seoul (KR)

(72) Inventors: Jae Hoon Chung, Gyeonggi-do (KR); Sung Un Kim, Gyeonggi-do (KR); Si Hoon Sung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/700,628

(22) Filed: Dec. 2, 2019

(65) Prior Publication Data

US 2020/0307513 A1 Oct. 1, 2020

(30) Foreign Application Priority Data

Mar. 27, 2019 (KR) .......................... 10-2019-0035045

(51) Int. Cl.
*B60R 25/01* (2013.01)
*G08C 17/04* (2006.01)
*G07C 9/00* (2020.01)

(52) U.S. Cl.
CPC .......... *B60R 25/01* (2013.01); *G07C 9/00309* (2013.01); *G08C 17/04* (2013.01); *G07C 2209/63* (2013.01)

(58) Field of Classification Search
None
See application file for complete search history.

(56) References Cited

U.S. PATENT DOCUMENTS

2015/0329121 A1* 11/2015 Lim ..................... H04M 1/7253
701/36
2016/0369889 A1* 12/2016 Kim .................... F16H 59/0217

* cited by examiner

*Primary Examiner* — Adolf Dsouza
(74) *Attorney, Agent, or Firm* — Mintz Levin Cohn Ferris Glovsky and Popeo, P.C.; Peter F. Corless

(57) ABSTRACT

A method for controlling a vehicle using a smart key is provided and includes sensing at least one of a vehicle state, an attachment state of the smart key, and a detachment state of the smart key, the smart key including a magnet, and adjusting a magnetic force of at least one electromagnet provided in a smart key recognizer disposed in a predetermined attachment region inside the vehicle based on a plurality of levels and a result of the sensing. The levels include at least a first level occurring before driving and a second level occurring during driving, and a magnetic force corresponding to the second level is greater than a magnetic force corresponding to the first level.

20 Claims, 15 Drawing Sheets

IN-VEHICLE CONTROL APPARATUS USING SMART KEY PROVIDED WITH DISPLAY AND METHOD FOR CONTROLLING THE SAME

This application claims the benefit of Korean Patent Application No. 10-2019-0035045, filed on Mar. 27, 2019, which is hereby incorporated by reference as if fully set forth herein.

BACKGROUND

Field of the Disclosure

In general, a smart key, which is detected wirelessly within a particular distance from a vehicle or inside the vehicle without inserting the key into the vehicle, is applied to recently developed vehicles. Smart keys are generally divided into a plate-type card key and a fob key having a flat polygonal or circular shape, and a plurality of key buttons is provided on the upper surfaces thereof. One key button is mapped to one function, and, as the number of functions allowing control via a smart key is increased, the number of key buttons tends to be increased. For example, with the application of new technology, such as remote automatic parking, the configuration of key buttons on smart keys becomes complex. Further, demand for calling and controlling vehicles remotely is expected to gradually increase.

However, the smart key is typically used outside a vehicle to control various functions via key buttons, and merely functions to allow starting of the vehicle or unlock an immobilizer based on whether the smart key is sensed inside the vehicle.

SUMMARY

The present disclosure provides an in-vehicle control apparatus using a smart key having a display and a method for controlling the same. The in-vehicle control apparatus and the method substantially obviate one or more problems due to limitations and disadvantages of the related art. A more convenient in-vehicle control system and a method for controlling the same are provided.

The present disclosure further provides an in-vehicle control system which may execute various vehicle functions using a smart key having a display, and a method for controlling the same. The present disclosure further provides an in-vehicle control system may change a magnitude of magnetic force based on a situation in terms of fixing of the smart key via the magnetic force, and a method for controlling the same.

Additional advantages, objects, and features will be set forth in part in the following description and in part will become apparent to those having ordinary skill in the art upon examination of the following or may be learned from practice. The objectives and other advantages may be realized and attained by the structure particularly pointed out in the written description, equivalents thereof, and claims hereof as well as the appended drawings.

A method for controlling a vehicle using a smart key may include sensing, by an integrated controller, at least one of a vehicle state, an attachment state of the smart key, and a detachment state of the smart key, the smart key including a magnet, and adjusting, by the integrated apparatus, a magnetic force of at least one electromagnet provided in a smart key recognizer disposed in a predetermined attachment region inside the vehicle based on a plurality of levels and a result of the sensing. The levels may include at least a level 1 (or a first level) occurring before driving and a level 2 (or a second level) occurring during driving, and a magnetic force corresponding to the level 2 may be greater than a magnetic force corresponding to the level 1.

In another exemplary embodiment, an in-vehicle control system may include an integrated apparatus having a smart key recognizer disposed in a predetermined attachment region inside a vehicle and having at least one electromagnet. The in-vehicle control system may further include a wired communication unit configured to acquire information about a vehicle state. The in-vehicle control system may include a controller configured to adjust a magnetic force of the at least one electromagnet based on a plurality of levels and at least the vehicle state and an attachment and detachment state of a smart key including a magnet. The levels may include at least a level 1 occurring before driving and a level 2 occurring during driving, and a magnetic force corresponding to the level 2 may be greater than a magnetic force corresponding to the level 1.

Both the foregoing general description and the following detailed description are exemplary and explanatory and are intended to provide further explanation of one or more exemplary embodiments as claimed.

BRIEF DESCRIPTION OF THE DRAWINGS

The accompanying drawings provide further understanding, are incorporated herein, and constitute a part of this application. The accompany drawings illustrate exemplary embodiments and together with the description serve to explain the exemplary embodiments. In the drawings.

DETAILED DESCRIPTION

Figure 1:
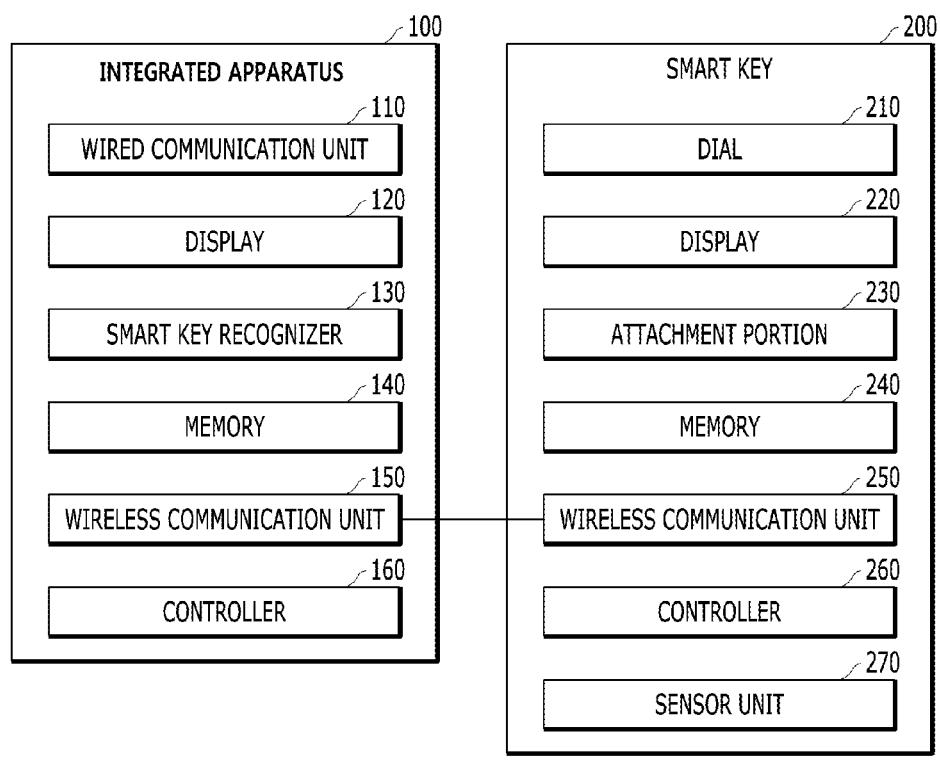
FIG. 1 is a block diagram illustrating one example of an in-vehicle control system structure including a smart key in accordance with one exemplary embodiment.

Reference will now be made in detail to exemplary embodiments illustrated in the accompanying drawings. However, the disclosure is not limited to the exemplary embodiments set forth herein, and may be variously modified. In the drawings, to clearly describe the exemplary embodiments, descriptions of elements not related to the exemplary embodiments may be omitted. Additionally, the same or similar elements may be denoted by the same reference numerals even when they are depicted in different drawings.

In the following description of the exemplary embodiments, terms such as "including", etc. will be interpreted as indicating the presence of one or more other characteristics, numbers, steps, operations, elements or parts stated in the specification or combinations thereof, and do not exclude presence of characteristics, numbers, steps, operations, elements, parts or combinations thereof, or possibility of adding the same, unless stated otherwise.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although at least one exemplary embodiment is described as using a plurality of units to perform the exemplary process, it is understood that the exemplary processes may also be performed by one or plurality of modules. Additionally, it is understood that the term controller may refer to a hardware device that includes a memory and a processor. The memory may be configured to store the modules and the processor may be specifically configured to execute said modules to perform one or more processes which are described further below.

The use of the terms "first", "second", "third" and so on (and their numeric equivalents), herein, are provided to identify the operations, without describing the order of the operations, and the operations may be executed in a different order from the stated order unless a specific order is definitely specified in the context.

Furthermore, control logic of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

One exemplary embodiment proposes a method for controlling various functions of a vehicle using a smart key provided with a display if the smart key is attached to a designated point inside the vehicle. First, an in-vehicle control system structure including a smart key that may be applied to exemplary embodiments will be described with reference to FIG. 1. FIG. 1 is a block diagram illustrating one example of an in-vehicle control system structure including a smart key in accordance with one exemplary embodiment. One or more steps of the methods described herein may be executed by a controller.

Referring to FIG. 1, the in-vehicle control system in accordance with one exemplary embodiment may include an integrated apparatus 100 and a smart key 200. The integrated apparatus 100 may include a wired communication unit 110, a display 120, a smart key recognizer 130, a memory 140, a wireless communication unit 150 and a controller 160. Hereinafter, the respective elements will be described in detail. The controller 160 may be configured to operate the other components within the apparatus.

The wired communication unit 110 may be configured to exchange data with controllers. The controllers may at least be in charge of each of a plurality of in-vehicle functions to be executed. As one example, the wired communication unit 110 may be configured to support at least one of in-vehicle communication schemes, including a controller area network (CAN), CAN-FD, local interconnect network (LIN), Ethernet, etc. As another example, the wired communication unit 110 may be configured to receive operation state information from an air-conditioning controller to execute an air-conditioning function, a body controller in charge of a convenience function of a seat, etc. and an audio/video/navigation (AVN) system, etc., and transmit control commands thereto.

The display 120 may be configured to operate to visually output an operating state of the vehicle, such as a navigation guidance screen, operating state information of an air-conditioning system, playback state information of a multimedia function, etc., or various pieces of information required by a driver. If the display 120 is a touchscreen, the display 120 may be configured to display a virtual control system to execute at least some functions, and sense a touch command input to the virtual control system.

The smart key recognizer 130 may be configured to sense whether the smart key 200, which will be described below, is attached to/detached from the inside of the vehicle. For example, the smart key recognizer 130 may be configured to include at least one of a Hall sensor configured to detect magnetic force, a near-field communication (NFC) transceiver configured to perform NFC communication, or a wireless charging transmitter configured to sense a wireless charging receiver. In other words, the smart key recognizer 130 may be configured to sense the smart key 200 via the Hall sensor if the smart key 200 is provided with a permanent magnet, sense the smart key 200 via the NFC transceiver if the smart key 200 is provided with an NFC tag, and sense the smart key 200 via the wireless charging transmitter if the smart key 200 is provided with a wireless charging receiver. These sensing units are only exemplary, and the disclosure is not limited thereto. Further, independently of the smart key system (SMK) controller to merely sense whether a smart key is present inside a vehicle, the smart key recognizer 130 may be configured to sense whether the smart key 200 is attached to a specific position on the integrated apparatus 100.

The memory 140 may be configured to store an operating system to drive the integrated apparatus 100, various application programs executed on the operating system, multimedia content, input/output control information, etc. The wireless communication unit 150 may be connected at least to a wireless communication unit 250 of the smart key 200 using a short range communication protocol (for example, Bluetooth, Wi-Fi, ZigBee, NFC, etc.) or a 3/4/5G protocol, and may thus perform data exchange. The wireless communication unit 150 may be configured to communicate with other elements in the vehicle, such as the AVN system, based on implementation. The controller 160 may be configured to perform overall control of the above-described respective elements, and perform determination and calculation necessary to execute the functions via interworking with the smart key 200 according to exemplary embodiments, which will be described below.

Further, the smart key 200 may include a dial 210 (or a wheel), a display 220, an attachment portion 230, a memory 240, the wireless communication unit 250 and a controller 260. First, the memory 250 may be configured to store an operating system to drive the smart key 200, identification information regarding the functions to be executed, graphical user interfaces to be output via the display 220 based on the functions to be executed, input/output control information, etc.

The wireless communication unit 250 may be connected at least to the wireless communication unit 150 of the integrated apparatus 100 using a short range communication protocol (for example, Bluetooth, Wi-Fi, ZigBee, NFC, etc.) or a 3/4/5G protocol, and may thus perform data exchange. Additionally, the wireless communication unit 250 may be configured to communicate with a telematics server or other smart devices (for example, a smartphone, a tablet, etc.). Further, the wireless communication unit 250 may include a radio frequency (RF) (for example, UHF, LF or the like) communication module communicating with an in-vehicle smart key system (SMK) controller to perform general functions of the smart key 200, such as door locking/unlocking, etc., and other functions performed outside the vehicle.

The controller 260 may be configured to operate the remaining elements, and perform determination and calculation necessary to execute the functions to be controlled via interworking with the integrated apparatus 100 according to exemplary embodiments, which will be described below. A sensor unit 270 may include at least one sensor configured to detect a direction in which the smart key 200 is disposed. For example, the sensor unit 270 may include at least one of a gyro sensor (also known as a gyroscopic sensor, an angular rate sensor an an angular velocity sensor) or an acceleration sensor. The sensor unit 270 may be configured to adjust a display state of the smart key 200 to display a user interface on the display 220 in a forward direction relative to a driver's view, when the smart key 200 having a cylindrical external shape and provided with the circular display 220 is attached to an attachment position corresponding to the smart key recognizer 130.

In particular, the forward direction refers to a direction in which the driver expects to display text or an image constructing the user interface displayed on the display 220, on the assumption that the smart key 200 is fixed to the inside of the vehicle, other than in a detachable attachment manner. For example, if the smart key 200 or the display 220 has a rectangular shape, the driver intuitively attaches the smart key 200 to an attachment position so that a major axis or a minor axis of the rectangular smart key 200 or display 220 is parallel to the vertical direction, and thus a displayed user interface satisfies the forward direction in a landscape mode or in a portrait mode. However, if the smart key 200 has a cylindrical external shape or is provided with the display 220 having a circular shape, the driver may find it difficult to intuitively attach the smart key 200 to the inside of the vehicle in a specific orientation.

Therefore, in the display 220 of the smart key 200 in accordance with the exemplary embodiment, the user interface may be regarded as displayed in the forward direction, if text on one line written in the horizontal direction is arranged in a direction perpendicular to the direction of gravity. Accordingly, when the attachment direction of the smart key 200 is sensed by the sensor unit 270, the controller 260 may be configured to operate the display 220 to rotate, rearrange or reconstruct a user interface based on the sensed direction to display the user interface in the forward direction.

Figure 2A:
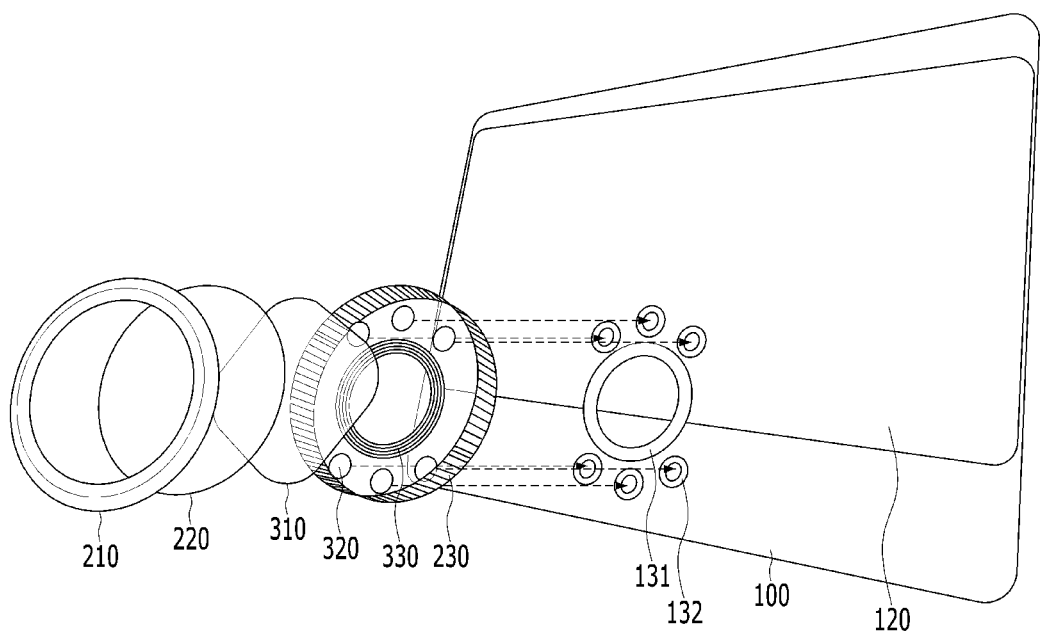
FIG. 2A is an exploded perspective view illustrating configurations of the smart key and an integrated apparatus in accordance with one exemplary embodiment.
Figure 2B:
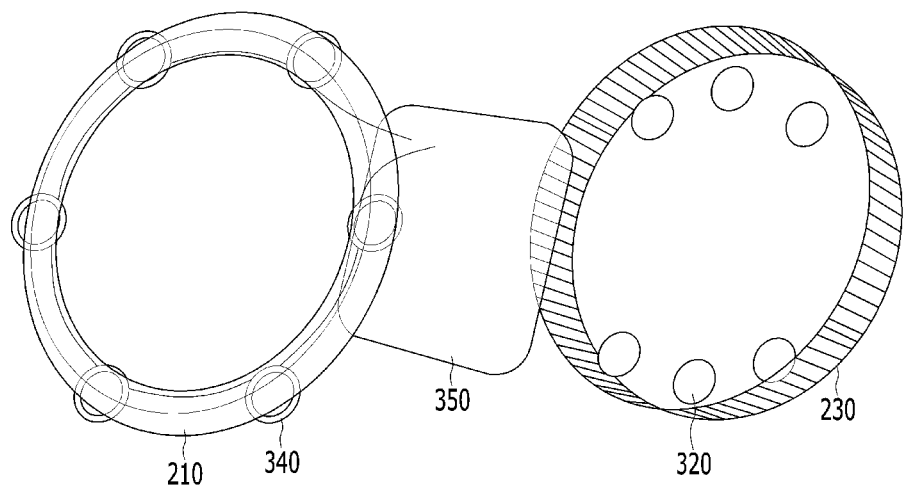
FIG. 2B is an exploded perspective view illustrating one example of a smart key structure including coils in a dial in accordance with one exemplary embodiment.

Hereinafter, the dial 210, the display 220 and the attachment portion 230 will be described in more detail with reference to FIGS. 2A and 2B. FIG. 2A is an exploded perspective view illustrating configurations of the smart key and the integrated apparatus in accordance with one exemplary embodiment, and FIG. 2B is an exploded perspective view illustrating one example of a smart key structure including coils in the dial in accordance with one exemplary embodiment.

Referring to FIG. 2A, the smart key 200 in accordance with the exemplary embodiment may have a cylindrical external shape. In particular, the smart key 200 may have a shape in which the toroidal or ring-type dial 210 surrounds the circular display 220. The attachment portion 230 including a contact surface used when the smart key 200 is attached to the display 120 of the integrated apparatus 100 may be disposed on the rear surface of the display 220. According to exemplary embodiments, the attachment portion 230 may form at least a part of a housing of the smart key 200.

The dial 210 may be configured to be rotatable about the display 220, and at least a rotational direction and a rotational degree (for example, a rotational displacement or angle) of the dial 210 may be sensed when a user grasps and rotates the dial 210. The disclosure is not limited to any detailed unit or method to sense rotation of the dial 20.

Although the display 220 has a circular shape, an actual display area does not always coincide with an edge area defined by the inner diameter of the dial 210, and the actual display area does not necessarily have a circular shape. Further, the display 220 may be implemented as a touchscreen to receive a touch command input to the display 220, and may have a push-button function. Further, sensing members formed of a piezoelectric material may be disposed in the form of an array on the lower surface of the display 220, and a fingerprint recognition sensor may be installed therein by connecting electrodes.

The attachment portion 230 may include a recognized unit corresponding to the configuration of the smart key recognizer 130, for example, one or more permanent magnets 320, an NFC tag, a wireless charging receiver coil 330, etc., as described above. In particular, the permanent magnets 320 may have an arrangement type corresponding to the arrangement type of magnetic bodies, for example, permanent magnets or electromagnets 132, arranged on the rear surface of the display 120 or at the peripheral region of the display 120 to be attached to the permanent magnets or the electromagnets 132 by magnetic force. The position of the wireless charging receiver coil 330 may correspond to the position of a wireless charging receiver coil 131 of the integrated apparatus 100.

In particular, a magnitude of magnetic force occurring between the permanent magnets 320 and the electromagnets 132 may be greater than the rotational resistance of the dial 210, as long as the smart key 200 attached to a predetermined region is not detached from the region by vibration generally occurring during driving of the vehicle. When a user rotates the dial 210, if the magnetic force is weaker than the rotational resistance of the dial 210, the dial 210 alone is not moved, and the entirety of the smart key 200 is rotated (for example, the display 220 is rotated therewith).

The magnitude of magnetic force may have various values based on the weight of the smart key 20, the orientation of the smart key 200 attached to the inside of the vehicle relative to the ground, and the rotational resistance of the dial 210. Further, the integrated apparatus 100 may be configured to gradually increase magnetic force of the electromagnets 132 to induce the smart key 200 to be attached to an attachment region, if the smart key 200 approaches the attachment region within a designated distance while the integrated apparatus 100 senses whether the smart key 200 approaches the attachment region via the smart key recognizer 130.

Referring to FIG. 2B, at least one coil 340 may be provided in the dial 210. The number and position of each of the at least one coil 340 may corresponds to those of the permanent magnets 320. In particular, emergency charging is possible via rotation of the dial 210. The function uses an electromagnetic induction phenomenon between the coils 340 and the permanent magnets 320.

Figures 3A, 3B:
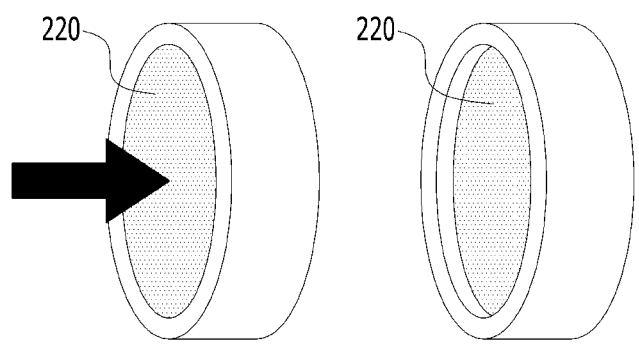
FIGS. 3A to 3C, inclusive, are views illustrating examples of a manner of operation of the control system in accordance with one exemplary embodiment.
Figure 3C:
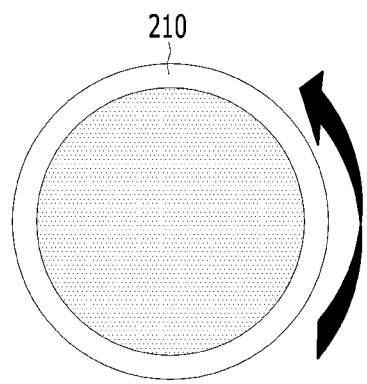

Further, a manner of operation of the control system in accordance with the exemplary embodiment will be described with reference to FIGS. 3A to 3C. FIGS. 3A to 3C are views illustrating examples of the manner of operation of the control system in accordance with one exemplary embodiment.

First, when the smart key 200 is configured as a push-button type, the smart key 200 may be operated so that the dial 210 or the display 220 is pressed from the front. For example, when the display 220 is pressed, as shown in FIG. 3A, the display 220 may retreat in the direction in which the display 220 is pressed by a designated distance, as exemplarily shown in FIG. 3B. If the display 220 is a touchscreen, when only a touch is performed at a designated pressure or less, only a touch input may be recognized. For example, touch commands may include a simple (relatively short) touch, a long touch, a double touch, in which a simple touch is input twice within a designated time, a touch-drag/flicking touch in which a drag is performed in an arbitrary direction in a touched state and then the touch is released, etc., and the respective touch commands may correspond to different control commands.

Otherwise, as exemplarily shown in FIG. 3C, the smart key 200 may be operated in a manner in which the dial 210 is rotated in the clockwise direction or in the counterclockwise direction. Based on the above-described apparatus configuration, a process of performing a function of interworking between the smart key 200 and the integrated apparatus 100 will be described with reference to FIGS. 4A and 4B.

Figure 4A:
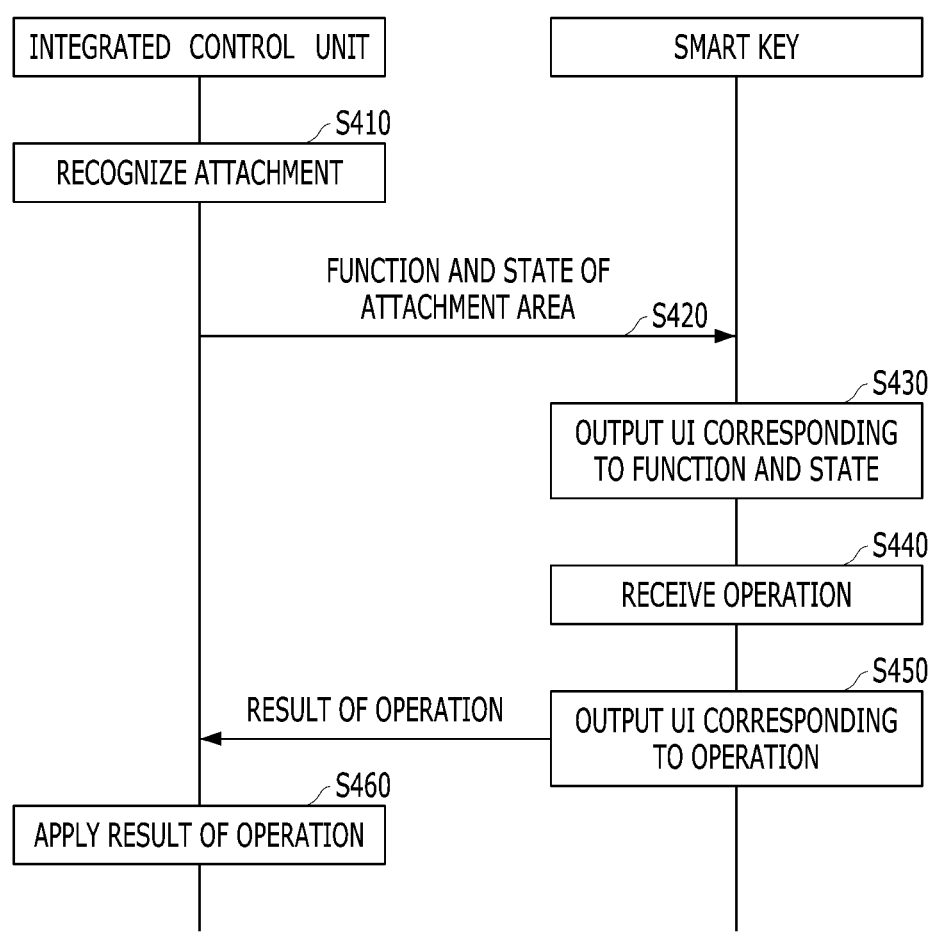
FIG. 4A is a flowchart illustrating one example of a process of operating an in-vehicle display system including the smart key in accordance with one exemplary embodiment.

FIG. 4A is a flowchart illustrating one example of a process of operating an in-vehicle display system including the smart key in accordance with one exemplary embodiment. Referring to FIG. 4A, since the smart key 200 is attached to a predetermined position inside the vehicle, the integrated apparatus 100 may be configured to sense whether the smart key 200 is attached to the predetermined position via the smart key recognizer 130 (and/or the attachment position of the smart key 200) (Operation S410).

The integrated apparatus 100 may be configured to transmit information regarding the function to be executed based on a current vehicle state to the smart key 200 via the wireless communication unit 150 (Operation S420). In particular, the information regarding the function to be executed may include a type of the function to be executed and current state information of the corresponding function. For example, the function to be executed based on the vehicle state may be a starting button function or a welcome function for a vehicle owner before the driver get into the vehicle starts the vehicle, and the disclosure is not limited thereto.

The smart key 200 may be configured to output a graphical user interface (UI) that corresponds to the function to the executed and the current state on the display 220 based on the received information (Operation S430). Thereafter, in response to receiving a user operation, i.e., the dial 210 is manipulated or a touch input or a push-type command is input on the display 220, (Operation S440), the smart key 200 may be configured to output a user interface that corresponds to the corresponding operation (i.e., change in the state information, etc. output via the user interface) (Operation S450) on the display 220. At the same time, information regarding the corresponding operation (for example, a manipulated variable, a controlled variable, a direction of operation, a type of changed function, etc.) may be transmitted to the integrated apparatus 100 via the wireless communication unit 250.

Figure 4B:
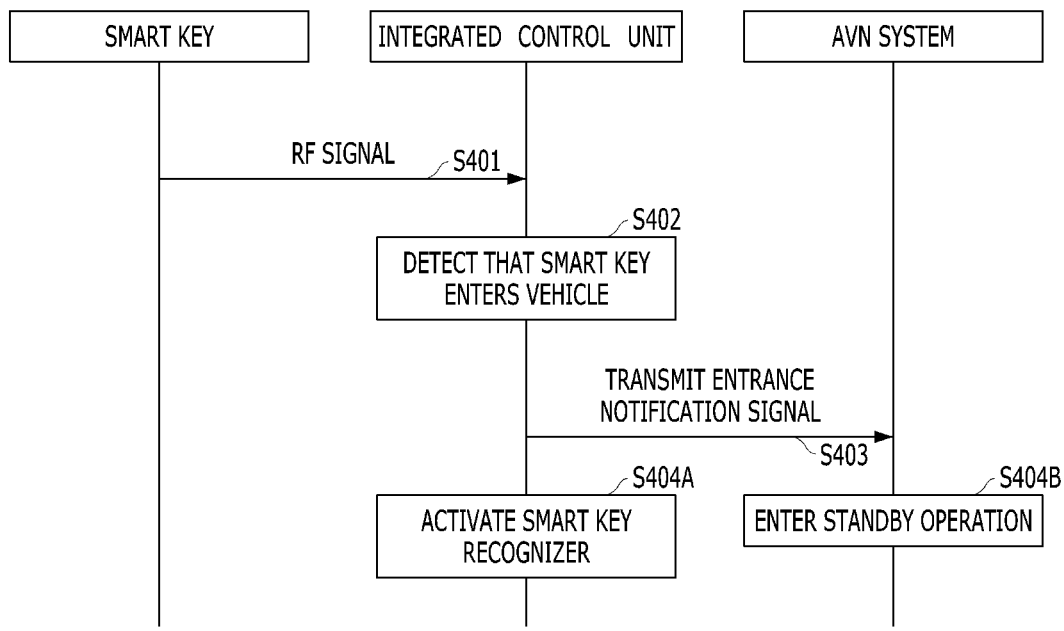
FIG. 4B is a flowchart illustrating a process of performing a function of the smart key when the smart key enters a vehicle in accordance with one exemplary embodiment.

The integrated apparatus 100 may be configured to reflect a result of the operation in the function to be executed based on the information regarding the corresponding operation (Operation S460). From when the driver possesses the smart key 200 and enters the vehicle before the smart key 20 is attached to the designated position inside the vehicle, a designated function may be performed. This will be described below with reference to FIG. 4B. FIG. 4B is a flowchart illustrating a process of performing a function of the smart key when the smart key enters a vehicle in accordance with one exemplary embodiment.

Respective operations of the process shown in FIG. 4B may be performed prior to the respective operations of the process shown in FIG. 4A. Referring to FIG. 4B, the smart key 200 may be configured to emit a predetermined RF signal at a designated cycle (Operation S401). When the signal is sensed by the integrated apparatus 100 (or the smart key system controller) inside the vehicle (Operation S402), an entry notification signal indicating entry of the smart key 200 into the vehicle may be transmitted to the AVN system (Operation S403).

When entry of the smart key 200 into the vehicle is sensed, the integrated apparatus 100 may be configured to activate the smart key recognizer 130 (Operation S404A). For example, power may be applied to the wireless charging receiver coil 131 and the electromagnets 132 of the smart key recognizer 130. Further, as the entry notification signal is received, the AVN system may be configured to enter a standby operation (Operation S404B).

Figure 5A:
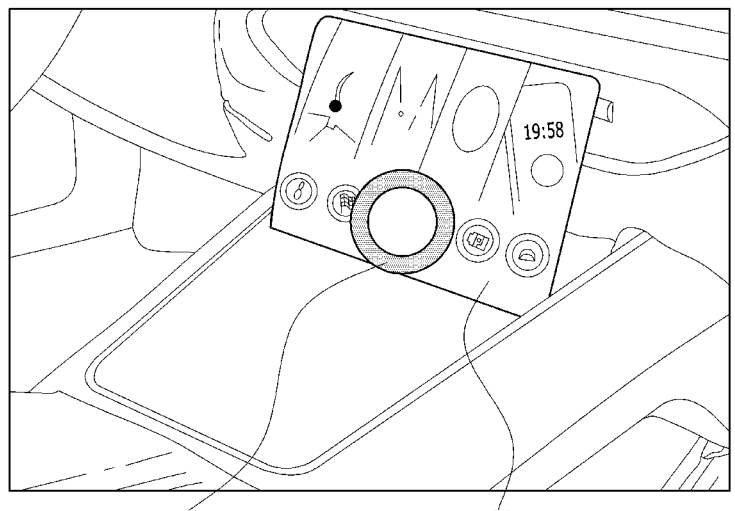
FIGS. 5A and 5B are views illustrating one example of attachment of the smart key to the inside of a vehicle in accordance with one exemplary embodiment.
Figure 5B:
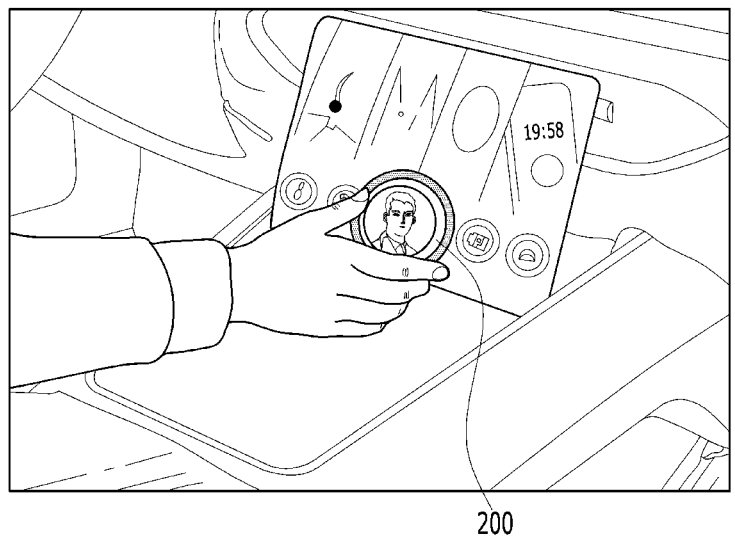
Figure 6A:
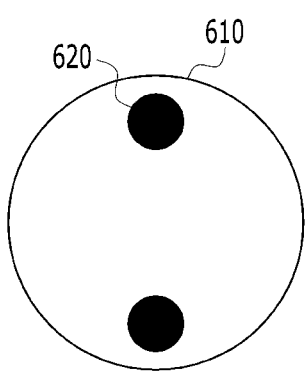
FIGS. 6A to 6F, inclusive, are views illustrating various examples of disposition of fixing units to fix the smart key in accordance with one exemplary embodiment.
Figure 6B:
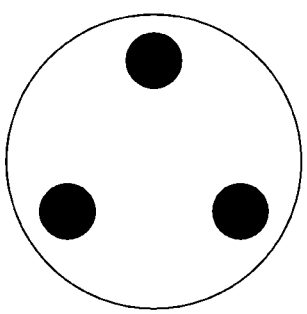
Figure 6C:
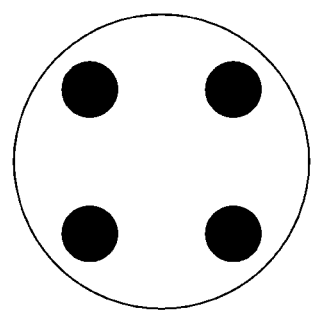
Figure 6D:
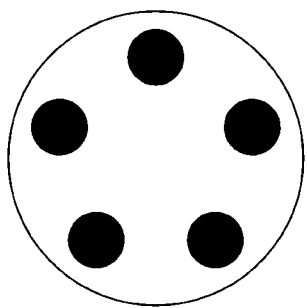
Figure 6E:
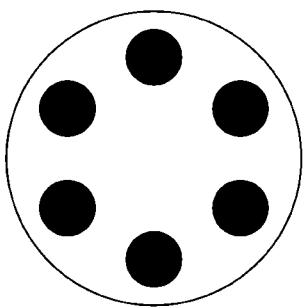
Figure 6F:
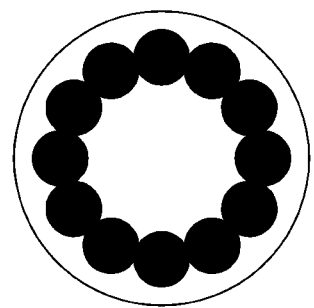

For example, the AVN system may be configured to perform pre-booting for rapid operation, or output a welcome message of a predetermined type when booting is completed. Further, a manner of attachment of the smart key will be described in detail with reference to FIGS. 5A and 5B. FIGS. 5A and 5B are views illustrating one example of attachment of the smart key to the inside of a vehicle in accordance with one exemplary embodiment.

First, referring to FIG. 5A, the display 120 of the integrated apparatus 100 may be disposed at the lower end of a center fascia, and an attachment position of the smart key 200 may be disposed in a central region 510 of the lower end of the display 120. In particular, a designated display object (for example, a circular object corresponding to the actual size of the smart key 200, displayed at the attachment position) may be displayed in the central region 510 to correspond to the attachment position to allow the user to visually recognize the attachment position. When the smart key 200 is attached to the central region 510 of the lower end of the display 120 in this state, as exemplarily shown in FIG. 5B, a driver image corresponding to the welcome function may be displayed on the display 220 of the smart key 200.

The region 510 to which the smart key 200 will be attached includes the permanent magnets or the electromagnets to fix the smart key 20 using magnetic force, together with the smart key recognizer 130, as described above. These fixing units will be described with reference to FIGS. 6A to 6F. FIGS. 6A to 6F are views illustrating various examples of disposition of fixing units to fix the smart key in accordance with one exemplary embodiment.

In all of FIGS. 6A to 6F, a big circle 610 corresponds to a planar shape of the smart key 20 and represents an attachment position of the smart key 200, and smaller circles 620 represent disposition positions of the permanent magnets or the electromagnets. For example, all of the smaller circles 620 may indicate permanent magnets or electromagnets, or some of the smaller circles 620 may indicate electromagnets and the remainder of the smaller circles 620 indicate be permanent magnets.

In particular, two or more electromagnets or permanent magnets may be provided to prevent the smart key 200 from rotating by operation of the dial 210 after attachment of the smart key 20. Further, the electromagnets or the permanent magnets may be disposed so that they are symmetric with respect to the center of the attachment position 610 as an origin. This aids in accurately attaching the smart key 200 to the attachment position 610 merely by bringing the smart key 200 proximate to the attachment position 610. The positions and number of electromagnets or permanent magnets disposed within the attachment position 610 may be applied to the attachment portion 230 of the smart key 200. Further, if the electromagnets are used, to save power, the electromagnets may be implemented to generate magnetic force when the smart key recognizer 130 senses the smart key 200.

Further, welcome and starting functions using the smart key will be described with reference to FIGS. 7A to 7D. FIGS. 7A to 7D are views illustrating one example of performance of the welcome and starting functions using the smart key in accordance with one exemplary embodiment.

Figure 7B:
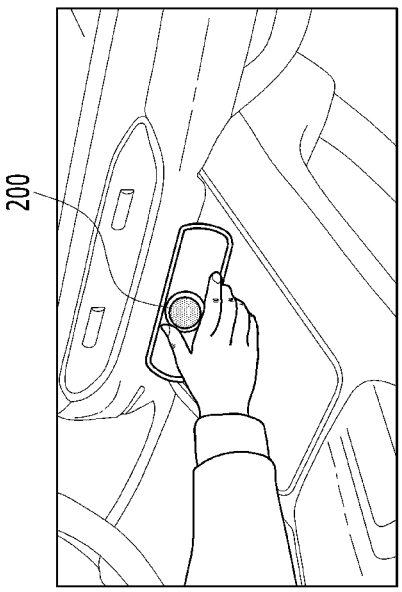
FIGS. 7A to 7D, inclusive, are views illustrating one example of performance of welcome and starting functions using the smart key in accordance with one exemplary embodiment.
Figure 7D:
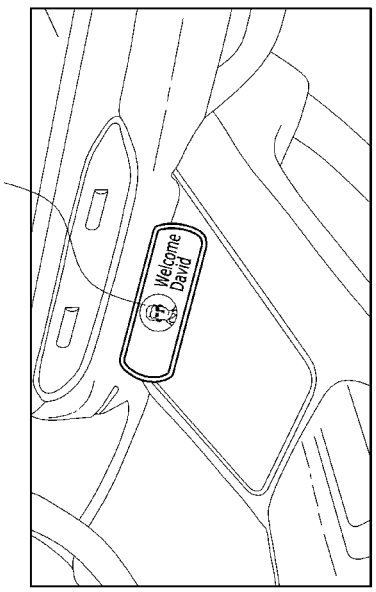
Figure 7A:
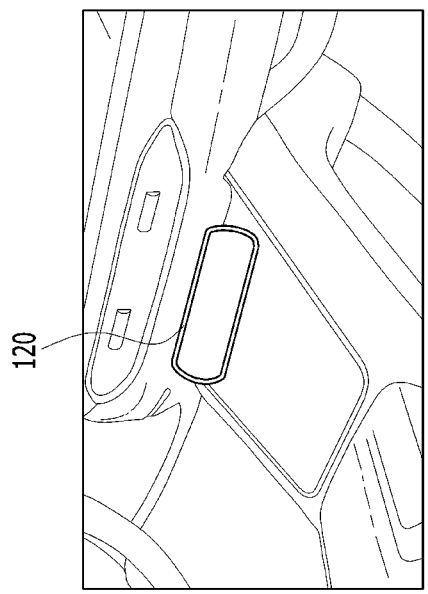
Figure 7C:
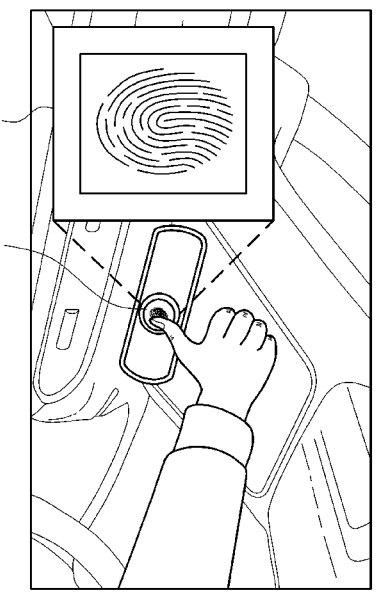

Referring to FIG. 7A, the display 120 of the integrated apparatus 100 may be disposed at the lower end of the center fascia, and the attachment region may be disposed at the center of the display 120. Before the vehicle is started, the display 120 may be turned off, and the smart key recognizer 130 alone may be activated. In particular, the smart key recognizer 130 may be activated if the in-vehicle smart key system (SMK) controller senses the smart key 200 inside the vehicle in the off state of the display 120.

When the driver enters the vehicle and attaches the smart key 200 to the center of the display 120 in this state, as exemplarily shown in FIG. 7B, start text may be displayed on the display 220 of the smart key 200. In particular, if the driver pushes the smart key 200, the vehicle may be started. If the fingerprint recognition sensor is provided in the display 220 of the smart key 200, the vehicle may be started via fingerprint recognition, as exemplarily shown in FIG. 7C. Further, a recognized fingerprint shape may be displayed on the display 220 of the smart key 200. The displayed fingerprint shape may differ from an actually recognized fingerprint shape.

In contrast with FIG. 7B, when the driver enters the vehicle and attaches the smart key 200 to the attachment region, a driver image may be displayed on the display 220 of the smart key 200, and a welcome message may be output via the display 120 of the integrated apparatus 100, as exemplarily shown in FIG. 7D. After the welcome message is output, transition from this state to the state of FIG. 7B may be performed.

Figure 8A:
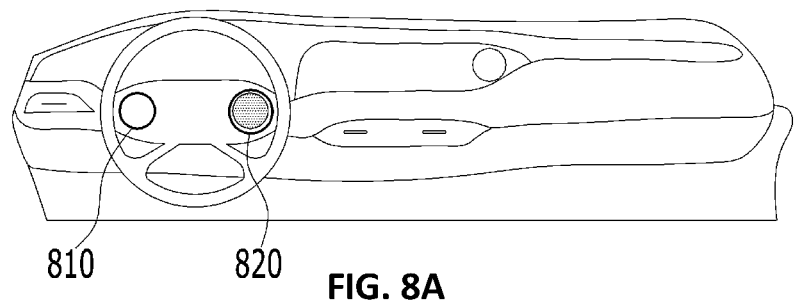
FIGS. 8A to 8C, inclusive, are views illustrating attachment regions in accordance with one exemplary embodiment.
Figure 8B:
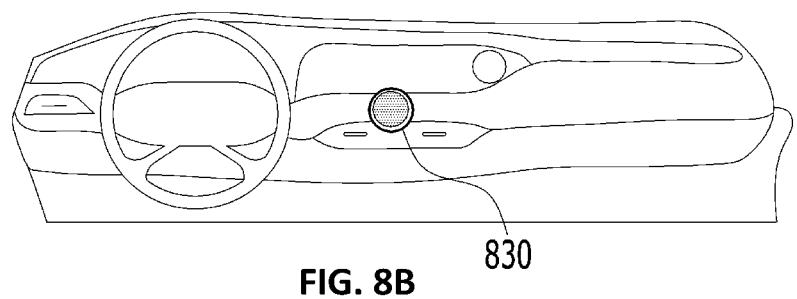
Figure 8C:
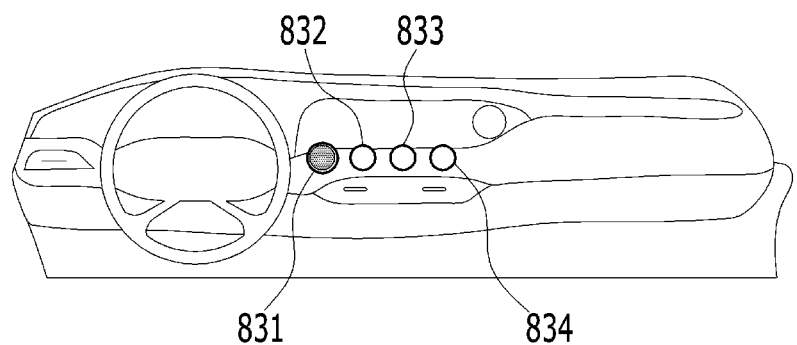

In the above-described exemplary embodiments, the attachment region may be disposed on the display 120 of the integrated apparatus 100 located at the lower end of the center fascia, or disposed at a region adjacent to the display 120. However, this position of the attachment region is only exemplary, and may be variously changed. Various attachment regions will be described below with reference to FIGS. 8A to 8C. FIGS. 8A to 8C are views illustrating attachment regions in accordance with one exemplary embodiment.

Referring to FIG. 8A, an attachment region 810 or 820 may be disposed at one point on a steering wheel. Otherwise, as exemplarily shown in FIG. 8B, an attachment region 830 may be disposed at the center of a center fascia.

According to exemplary embodiments, as shown in FIG. 8C, a plurality of attachment regions 831, 832, 833 and 834 may be provided at the center of a center fascia. In particular, a plurality of smart keys 200 may be simultaneously attached to the attachment regions 831, 832, 833 and 834, and thus form a part of the control system or provide different functions to be controlled based on attachment positions thereof. For example, if the smart key 200 is attached to the leftmost attachment region 831, air-conditioning control may be immediately performed via the dial 210, and, if the smart key 200 is attached to the rightmost attachment region 834, volume control of a multimedia output may be performed. The provision of the functions is only exemplary, and the provided functions may be variously changed.

Figure 9A:
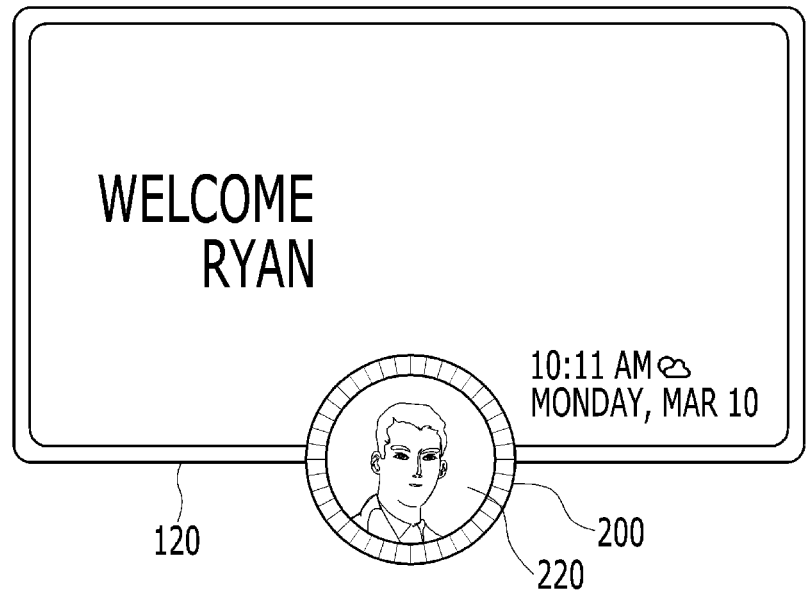
FIGS. 9A and 9B are views respectively illustrating user interfaces configured together with a display of the integrated apparatus when the smart key in accordance with one exemplary embodiment is attached to an attachment region inside a vehicle.
Figure 9B:
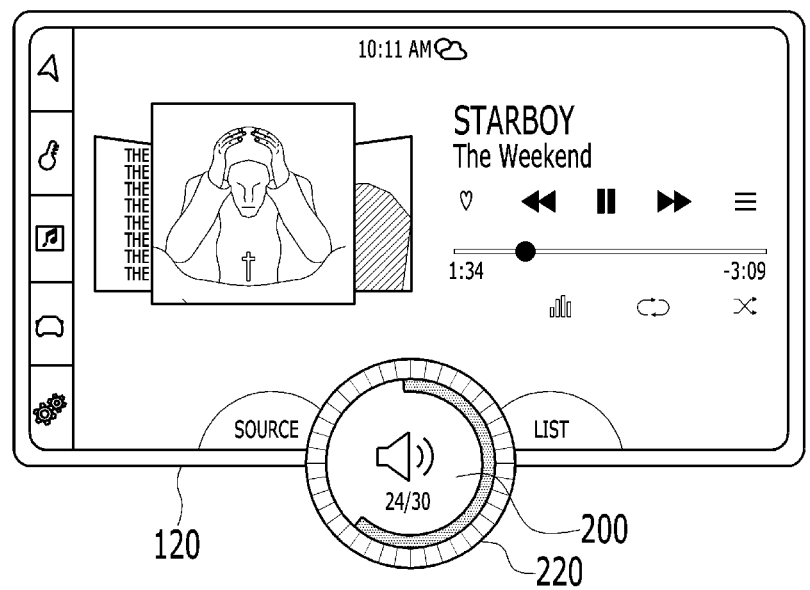

Further, user interfaces output when the smart key is attached to the attachment region will be described with reference to FIGS. 9A and 9B. FIG. 9A illustrates a user interface configured together with the display of the integrated apparatus, when the smart key in accordance with one exemplary embodiment is attached to an attachment region inside a vehicle. In the exemplary embodiments of FIGS. 9A and 9B, the attachment region may be disposed at the center of the lower end of the display 120 of the integrated apparatus.

First, referring to FIG. 9A, if a driver primarily attaches the smart key 200 to the attachment region after entering the vehicle, a driver image may be output on the display 220 of the smart key 200, and a welcome message and additional information, such as a time, a date, etc., may be displayed on the display 120 of the integrated apparatus 100. Further, referring to FIG. 9B, if a multimedia playback function is selected and thus a multimedia player is output on the display 120 of the integrated apparatus 100, current volume information may be displayed on the display 220 of the smart key 200. When the dial 210 is operated in this state, a volume value may be changed based on a degree and direction of rotation of the dial 210.

Meanwhile, in accordance with another exemplary embodiment, if the electromagnets 132 are applied to the smart key recognizer 130, the magnitude of magnetic force of the electromagnets 132 may be adjusted to a plurality of levels. For example, the levels may include a level before driving (i.e., a level 1), and a level during driving, and greater magnetic force may be generated in the level during driving than in the level before driving. Further, the level during driving may be divided into a general driving level (i.e., a level 2) and an emergency situation level (i.e., a level 3 (or a third level)). The division of the magnitude of the magnetic force into these levels operates to prevent energy loss occurring when excessive current is needlessly applied to the electromagnets 132 or malfunction of peripheral devices due to magnetic force.

Figure 10:
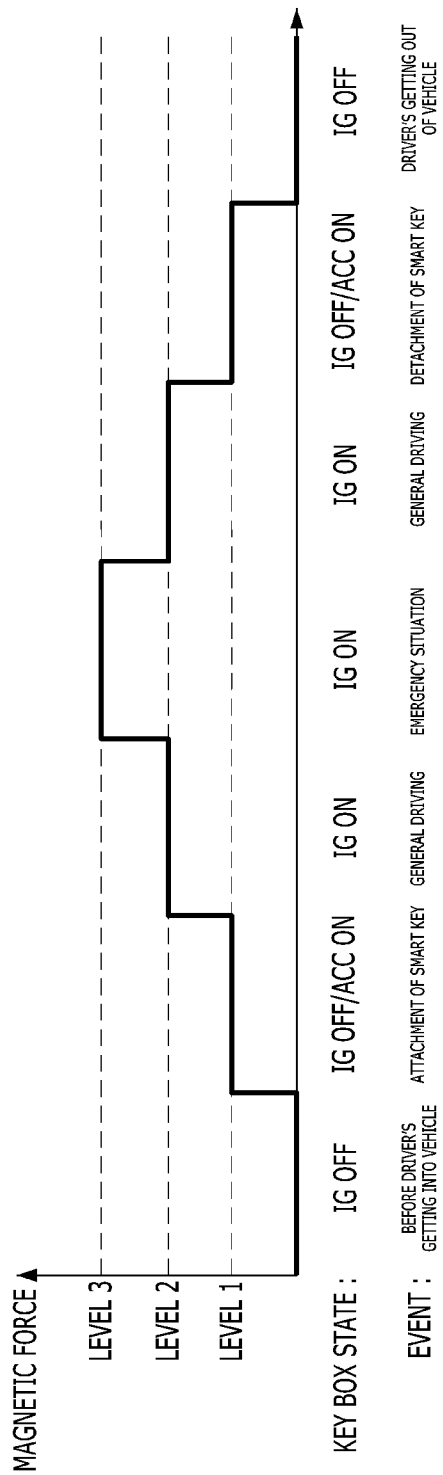
FIG. 10 is a graph representing one example of stepwise control of electromagnets in accordance with another exemplary embodiment.

The stepwise magnetic force control will be described with reference to FIG. 10 and FIGS. 11A and 11B. FIG. 10 is a graph representing one example of stepwise control of the electromagnets in accordance with another exemplary embodiment. In the graph shown in FIG. 10, the horizontal axis exemplarily enumerates states of a key box and types of detectable in-vehicle events as time passes, and the vertical axis represents a magnitude of magnetic force generated by the electromagnets 132 based on the state of the key box and the event.

In the exemplary embodiment of FIG. 10, the controller 160 may be configured to adjust the magnitude of magnetic force of the electromagnets 132 based on three levels and determine the state of the key box and the type of the event based on information acquired via the wired communication unit 110. For example, the controller 160 may be configured to determine whether a driver enters a vehicle by acquiring information about whether the smart key 200 is sensed inside the vehicle from the smart key system (SMK) controller, or acquiring information regarding whether a door is opened/closed from the body controller.

Further, the controller 160 may be configured to determine whether the smart key 200 is attached to the attachment region via the smart key recognizer 130, and determine whether driving of the vehicle is performed via the state of the key box and information regarding a current gear position acquired from a transmission controller. In addition, the controller 160 may be configured to determine an emergency situation via collision warning information or an airbag deployment signal received from an advanced driver assistance system (ADAS) or an airbag controller (ACU). The information forming the basis of the determination are only exemplary, and the disclosure is not limited thereto.

Referring to FIG. 10, in an IG OFF state before the driver enters the vehicle, the electromagnets 132 may generate no magnetic force. When the driver enters the vehicle and the state of the key box is changed into an accessory on (ACC ON) state or the smart key recognizer 130 senses attachment of the smart key 200, the electromagnets 132 may generate magnetic force corresponding to the level 1. In particular, the magnetic force corresponding to the level 1 may guide the smart key 200 to an attachment position when the smart key 200 approaches the attachment position, and have a magnitude sufficient to prevent movement of the smart key 200 at the attachment position due to a weight thereof and to enable simplified attachment/detachment of the smart key 200, without limit thereto.

Thereafter, when the key box enters an ignition on (IG ON) state, and the vehicle starts or the transmission is shifted to a drive gear position (D) or a reverse gear position (R), the controller 160 may be configured to recognize this situation as a general driving situation and change the magnetic force of the electromagnets 132 to the level 2. In particular, the magnetic force corresponding to the level 2 may have a magnitude sufficient to prevent release of the smart key 200 from the attachment position due to an impact occurring during driving or by driver's operation.

If an emergency situation, such as a collision prediction situation or an actual collision situation, occurs during driving, the magnetic force of the electromagnets 132 may be changed to the level 3. The magnetic force corresponding to the level 3 may have the maximal magnitude generated by the electromagnets 132, but the disclosure is not limited thereto. In particular, the magnetic force of the level 3 may be greater the magnetic force of the level 2.

When the emergency situation is terminated and the vehicle returns to the general or normal driving situation, the magnetic force of the electromagnets 132 may be adjusted again to the level 2, and, when the vehicle enters a driving termination situation, when turning off the ignition or shifting the transmission to a park gear position (P), the magnetic force of the electromagnets 132 may be adjusted again to the level 1. Thereafter, when the smart key 200 is detached from the attachment position and the driver exits the vehicle, the electromagnets 132 may no longer generate magnetic force.

Since an intensity of force of a user's hand operating the smart key 200 under the condition that the smart key 200 is attached to the attachment position varies based on the user, the magnitudes of magnetic force in the respective levels may be adjusted to facilitate use of the smart key 200. This will be described with reference to FIGS. 11A and 11B.

Figure 11A:
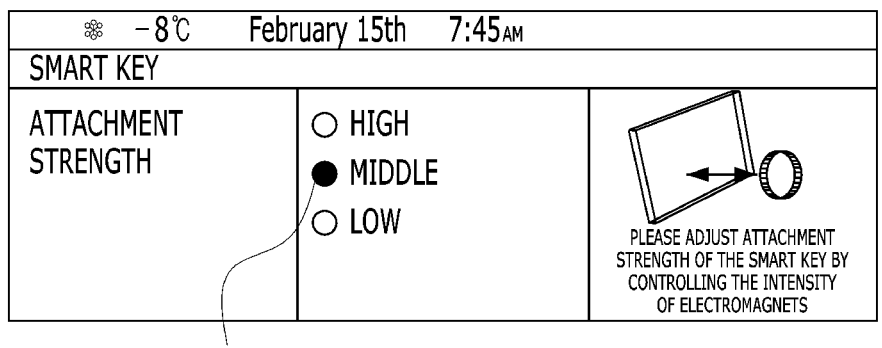
FIGS. 11A and 11B are views illustrating examples of construction of a menu to adjust a magnitude of magnetic force of the electromagnets in accordance with another exemplary embodiment.
Figure 11B:
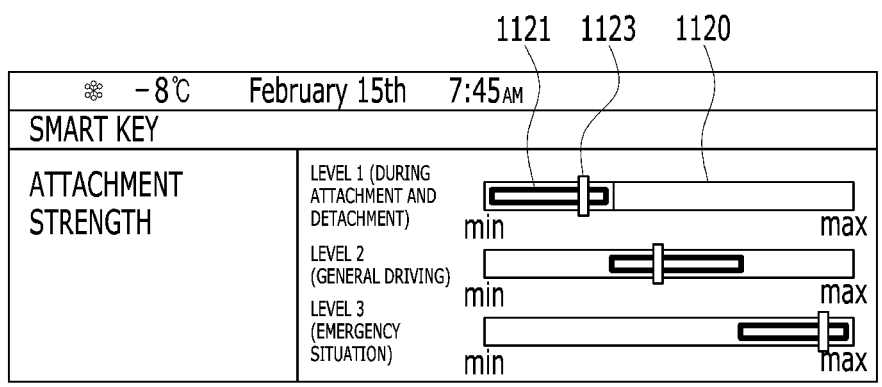

FIGS. 11A and 11B are views illustrating examples of construction of a menu to adjust a magnitude of magnetic force of the electromagnets in accordance with another exemplary embodiment. FIG. 11A illustrates construction of a menu to adjust a magnitude of magnetic force in the level 1 of the electromagnets 132 for attachment of the smart key 200 in accordance with this exemplary embodiment. This menu may be displayed via the display 120 of the integrated apparatus 100 via designated menu manipulation.

To prevent accidents during driving, the menu may be provided only if a transmission lever is located at the park gear position (P) or the vehicle is not in the IG ON state, and the controller 160 may be configured to permit release of the transmission lever from the park gear position (P) only when setting in this menu is completed or attachment of the smart key 200 to the attachment position is sensed. As described above with reference to FIG. 10, when the smart key 200 is attached to the attachment position and then gear shifting is performed, the magnetic force of the electromagnets 132 may be changed to the level 2.

During setting in the menu, the magnetic force of the electromagnets 132 may be maintained at the level 1, and the magnetic force corresponding to the level 1 may be changed in real time due to the setting state of the menu to allow the driver to find an appropriate magnitude of the magnetic force while attempting to repeatedly perform attachment and detachment of the smart key 200. However, the menu shown in FIG. 11A does not permit change of the magnetic force in the level 2 or the level 3. The setting of the magnetic force may be individually stored and applied by the identified user, as described above with reference to FIGS. 5A to 7D.

Further, FIG. 11B illustrates a menu which permits adjustment of all of the magnetic forces from the level 1 to the level 3. However, each of the magnetic forces in the level 1 to the level 3 may be adjusted only within an allowable adjustment range, and the allowable adjustment ranges in the respective levels may not overlap one another. For example, as exemplarily shown in FIG. 11B, among an entire allowable magnetic force range 1120 of the electromagnets 132, a designated range 1121 from the minimal magnitude may be assigned to the magnetic force of the level 1, and the magnetic force of the level 1 may be adjusted by moving a slider 1123 movable only within the corresponding range 1121.

In addition to the above-described functions, the smart key 200 in accordance with one exemplary embodiment, when attached to the inside of the vehicle, may control various functions to be controlled, as stated in Table 1 below.

TABLE 1

| Menu | Function to be controlled |
| --- | --- |
| Profile loading | Profile loading via recognition of user fingerprint via display |
| Home | Menu movement/menu selection |
| Media | Volume/song skipping/source change |
| Navigation | Zoom in & out/shortcut to preferred destination |
| Vehicle | Setting of drive mode/integrated setting of ADAS |
| Air-conditioning | Setting of air volume/temperature/mode |
| Setting | Menu selection/list movement/setting of detailed increase and decrease |

Although the above exemplary embodiments focus on illustration of the functions of the smart key 200 as a control system when the smart key 200 is attached to a predetermined attachment position inside a vehicle, the smart key 200 may perform original functions other than the control system in a state in which the smart key 200 is located outside the vehicle, or in which the smart key 200 is not attached to the attachment position even if the smart key 200 is located inside the vehicle. For example, the smart key 200 may not perform functions as the control system but may perform original functions in a state in which the smart key 200 is not attached to the attachment position.

These original functions of the smart key 200 will be described with reference to FIGS. 12A to 12D. FIGS. 12A to 12D are views illustrating one example of functions of the smart key in accordance with one exemplary embodiment.

Figures 12A, 12B:
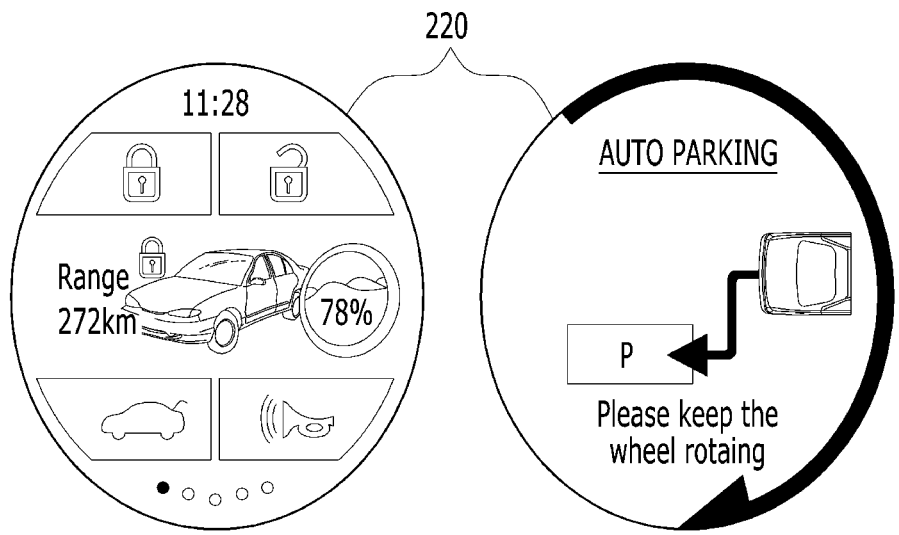
FIGS. 12A to 12D, inclusive, are views illustrating one example of functions of the smart key in accordance with one exemplary embodiment.

Referring to FIG. 12A, the smart key 200 may be configured to display touch buttons corresponding to door locking/unlocking, trunk opening and horn functions, etc. similar to a general smart key, and simultaneously display vehicle state information. Further, as exemplarily shown in FIG. 12B, if an automatic parking mode is activated by manipulation of a designated menu, automatic parking may be performed by rotation of wheels. Further, as exemplarily shown in FIG. 12C, if a remote starting function is performed, a user interface, through which a controlled value for air conditioning performed at the time of starting the vehicle will be selected, may be output.

Figures 12C, 12D:
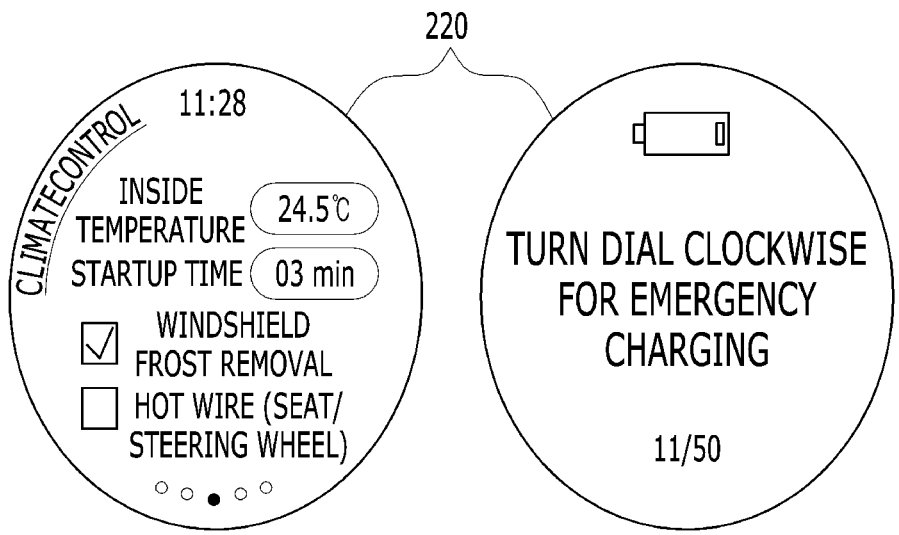

In addition, as exemplarily shown in FIG. 12D, if the state of charge (SOC) of a battery is a designated level or lower, rotation of the dial 210 may indicate that emergency charging is possible. This function employs a charging function using electromagnetic induction between the above-described coils 340 and permanent magnets 320 shown in FIG. 2B, and the number of rotations of the dial 210 necessary to charge the battery up to a predetermined state may be displayed on the display 220.

In addition to the above-described functions, the smart key 200 in accordance with one exemplary embodiment may be configured to execute various other functions stated in Table 2 below, outside the vehicle. To execute these functions, the smart key 200 may be configured to communicate with the vehicle via a telematics center or via cellular communication.

TABLE 2

| Classification | Menu | Main function |
| --- | --- | --- |
| Smart key function | Door | Locking/unlocking/trunk |
| | Automatic parking | Remote starting, parking-in/out |
| Telematics | Vehicle state confirmation | Door opening/air-conditioning, etc. |
| | Vehicle remote control | Operation of air conditioner/heat wire/window, etc. |
| Other content | Biometrics | Identification of user using fingerprint recognition via display |
| | Vehicle monitoring | Use of surround view monitor (SVM) Monitoring of surroundings of vehicle |
| | Interworking with smartphone | Interworking with schedule/weather/destination/battery SOC |
| | Loss notification | Confirmation of key position |

Figure 13A:
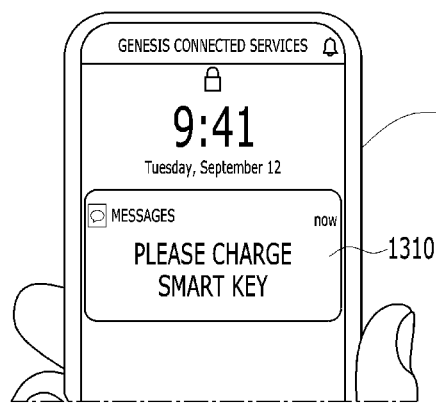
FIGS. 13A and 13B are views illustrating examples of a function of interworking the smart key in accordance with one exemplary embodiment with a smartphone.
Figure 13B:
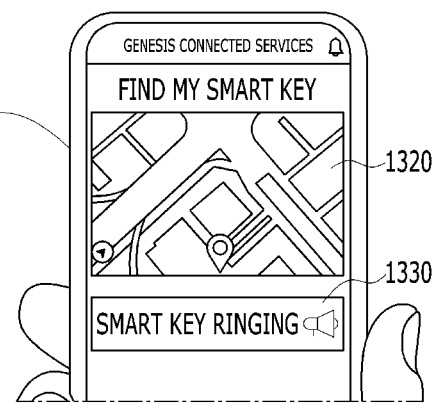

Some of the functions stated in Table 2 will be described in more detail with reference to FIGS. 13A and 13B. FIGS. 13A and 13B are views illustrating examples of a function of interworking of the smart key in accordance with one exemplary embodiment with a smartphone.

In one example, while the smart key 200 may be used as an in-vehicle control system, the smart key 200 may be charged via wireless charging, but, when the SOC of a battery of the smart key 200 reaches a designated level (for example, less than about 15%) if the vehicle is not used for a long period of time, a driver's smart device may be notified via cellular communication that the smart key 200 requires charging. The driver's smart device may be registered in advance. Thereby, as exemplarily shown in FIG. 13A, a message 1310 indicating that the smart key 200 requires charging may be displayed on a driver's smartphone 1310.

In another example, if the smart key 200 is provided with a global positioning system (GPS) module and a speaker, as exemplarily shown in FIG. 13B, when a driver executes a designated application via a smartphone, position information of the smart key 200 may be received via cellular communication, and the the position of the smart key 200 may be displayed on a map 1320 of the smartphone. Further, when the driver approaches the position displayed on the map 1320, the driver may select a smart key alarm button 1330 to output sound via the speaker of the smart key 200, and thus conveniently find the lost smart key 200.

Further, although the above-described exemplary embodiment describes the smart key 200 as output an user interface via interworking with the display 120 of the integrated apparatus 100, the disclosure is not limited thereto, and the smart key 200 may be attached to a position around a touch panel having no display function so that the smart key 200 and the touch panel may together constitute an in-vehicle control system.

The above-described method for controlling the vehicle using the smart key in accordance with the exemplary embodiments may provide several effects, as follows. First, freedom in design of the smart key itself and the in-vehicle control system and intuitive utilities thereof may be increased due to reduction in the number of switches. In one example, physical key buttons of the smart key may be simplified. In another example, center fascia and floor console switches may be integrated due to function integration.

Further, the smart key may be attached to and detached from the attachment region using magnetic force, and thus utility of the smart key is increased. In other words, instead of a mechanical structure for fixing the smart key to the attachment region, magnetic force of permanent magnets or electromagnets is used, and thus the smart key may be attached to the attachment region merely by bringing the smart key proximate to the attachment region.

Moreover, if the smart key has a wireless charging function, the smart key may automatically perform wireless charging only when the smart key is attached to the inside of the vehicle, and thus removing the necessity to prepare a separate charging slot or to replace the battery. In addition, with a sensation of operation of the physical dial, when the smart key is used during driving of the vehicle, a check of a degree of operation of the dial with the naked eye is not required, thereby allowing the driver to keep their eyes forward on the road.

The above-described method in accordance with at least one exemplary embodiment may be implemented as computer readable code in a non-transitory computer readable recording medium in which programs are recorded. The non-transitory computer readable recording media may include all types of recording media in which data readable by computer systems is stored. For example, the non-transitory computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, an in-vehicle control apparatus in accordance with at least one exemplary embodiment may provide a more convenient user interface via interworking with a smart key provided with a display. Further, a differential function based on the position of the smart key provided with the display relative to a vehicle may be provided. Particularly, the smart key constitutes a part of a in-vehicle control system, and may thus control various functions based on the state of the vehicle. Moreover, the magnetic force of electromagnets for fixing the smart key may be changed, thereby providing ease and safety in attachment and detachment of the smart key.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method for controlling a vehicle using a smart key, comprising:
    sensing, by an integrated apparatus, at least one of a vehicle state, an attachment state of the smart key, and a detachment state of the smart key, the smart key comprising a magnet; and
    adjusting, by the integrated apparatus, a magnetic force of at least one electromagnet provided in a smart key recognizer disposed in a predetermined attachment region inside the vehicle in a plurality of levels based on a result of the sensing,
    wherein the levels include at least a first level occurring before driving and a second level occurring during driving, and
    wherein a magnetic force corresponding to the second level is greater than a magnetic force corresponding to the first level.

2. The method according to claim 1, wherein the second level occurs during driving, the levels further include a third level occurring in a predetermined emergency situation, and a magnetic force corresponding to the third level is greater than the magnetic force corresponding to the second level.

3. The method according to claim 1, further comprising:
    outputting, by the integrated apparatus, a magnetic force adjustment menu in a first display provided in the integrated apparatus based on a designated command input; and
    changing, by the integrated apparatus, at least the magnetic force corresponding to the first level based on a setting in the magnetic force adjustment menu.

4. The method according to claim 3, wherein the outputting of the magnetic force adjustment menu is permitted at a specific gear position.

5. The method according to claim 4, further comprising disallowing, by the integrated apparatus, shifting of the specific gear position until the setting in the magnetic force adjustment menu is completed.

6. The method according to claim 1, further comprising:
    transmitting, by the integrated apparatus, information regarding a function to be executed corresponding to the vehicle state to the smart key;
    outputting, by the integrated apparatus, a user interface corresponding to the information regarding the function to be executed, on a second display of the smart key;
    if an operation unit provided in the smart key is operated, transmitting, by the smart key, result information due to the operation to the integrated apparatus; and
    executing, by the integrated apparatus, the function based on the result information.

7. The method according to claim 6, wherein the smart key has a cylindrical external shape, and the second display is disposed at a center of the smart key to have a circular shape.

8. The method according to claim 7, wherein the operation unit includes a dial having a ring shape configured to surround the second display.

9. The method according to claim 1, wherein the vehicle state includes at least one of the group consisting of: a key box state, a current gear position of a transmission, whether a collision warning is present, an airbag state, and whether the smart key inside the vehicle is sensed.

10. A non-transitory computer readable recording medium containing program instructions executed by a processor or controller, the non-transitory computer readable recording medium comprising instructions for:
sensing at least one of a vehicle state, an attachment state of the smart key, and a detachment state of the smart key, the smart key including a magnet; and
adjusting a magnetic force of at least one electromagnet provided in a smart key recognizer disposed in a predetermined attachment region inside the vehicle in a plurality of levels based on a result of the sensing,
wherein the levels include at least a first level occurring before driving and a second level occurring during driving, and
wherein a magnetic force corresponding to the second level is greater than a magnetic force corresponding to the first level.

11. An in-vehicle control system, comprising:
an integrated apparatus including:
a smart key recognizer disposed in a predetermined attachment region inside a vehicle and having at least one electromagnet;
a wired communication unit configured to acquire information regarding a vehicle state, and
a controller configured to adjust a magnetic force of the at least one electromagnet in a plurality of levels based on at least the vehicle state and an attachment state of a smart key, and a detachment state of the smart key, the smart key including a magnet,
wherein the levels include at least a first level occurring before driving and a second level occurring during driving, and
wherein a magnetic force corresponding to the second level is greater than a magnetic force corresponding to the first level.

12. The in-vehicle control system according to claim 11, wherein the second level occurs during driving, the levels further include a third level occurring in a predetermined emergency situation, and a magnetic force corresponding to the third level is greater than the magnetic force corresponding to the second level.

13. The in-vehicle control system according to claim 11, wherein the controller is configured to output a magnetic force adjustment menu in a first display provided in the integrated apparatus based on a designated command input, and change at least the magnetic force corresponding to the first level based on a setting in the magnetic force adjustment menu.

14. The in-vehicle control system according to claim 13, wherein the controller is configured to allow the output of the magnetic force adjustment menu at a specific gear position.

15. The in-vehicle control system according to claim 14, wherein the controller is configured to disallow shifting of the specific gear position until the setting in the magnetic force adjustment menu is completed.

16. The in-vehicle control system according to claim 11, wherein the controller is configured to:
transmit, upon sensing attachment of the smart key to the attachment region in the smart key recognizer, information regarding a function to be executed to the smart key; and
execute, upon receiving result information due to operation in an operation unit provided in the smart key from the smart key, the function to be executed based on the result information.

17. The in-vehicle control system according to claim 16, further including:
the smart key having a second display configured to display a second user interface corresponding to information regarding the function to be executed, and the operation unit,
wherein the smart key has a cylindrical external shape, and
wherein the second display is disposed at a center of the smart key to have a circular shape.

18. The in-vehicle control system according to claim 17, wherein the operation unit includes a dial having a ring shape configured to surround the second display.

19. The in-vehicle control system according to claim 11, wherein the vehicle state includes at least one of the group consisting of: a key box state, a current gear position of a transmission, whether a collision warning is present, an airbag state, and whether the smart key inside the vehicle is sensed.

20. The in-vehicle control system according to claim 11, wherein the smart key performs only predetermined smart key functions in a state in which the smart key is not attached to the attachment region.

* * * * *